March 10, 1959 — J. H. SCHMIDT — 2,876,573
TAPERED-SHAFT AND HUB-ELEMENT LOCKING AND RELEASING MEANS
Filed Feb. 11, 1957
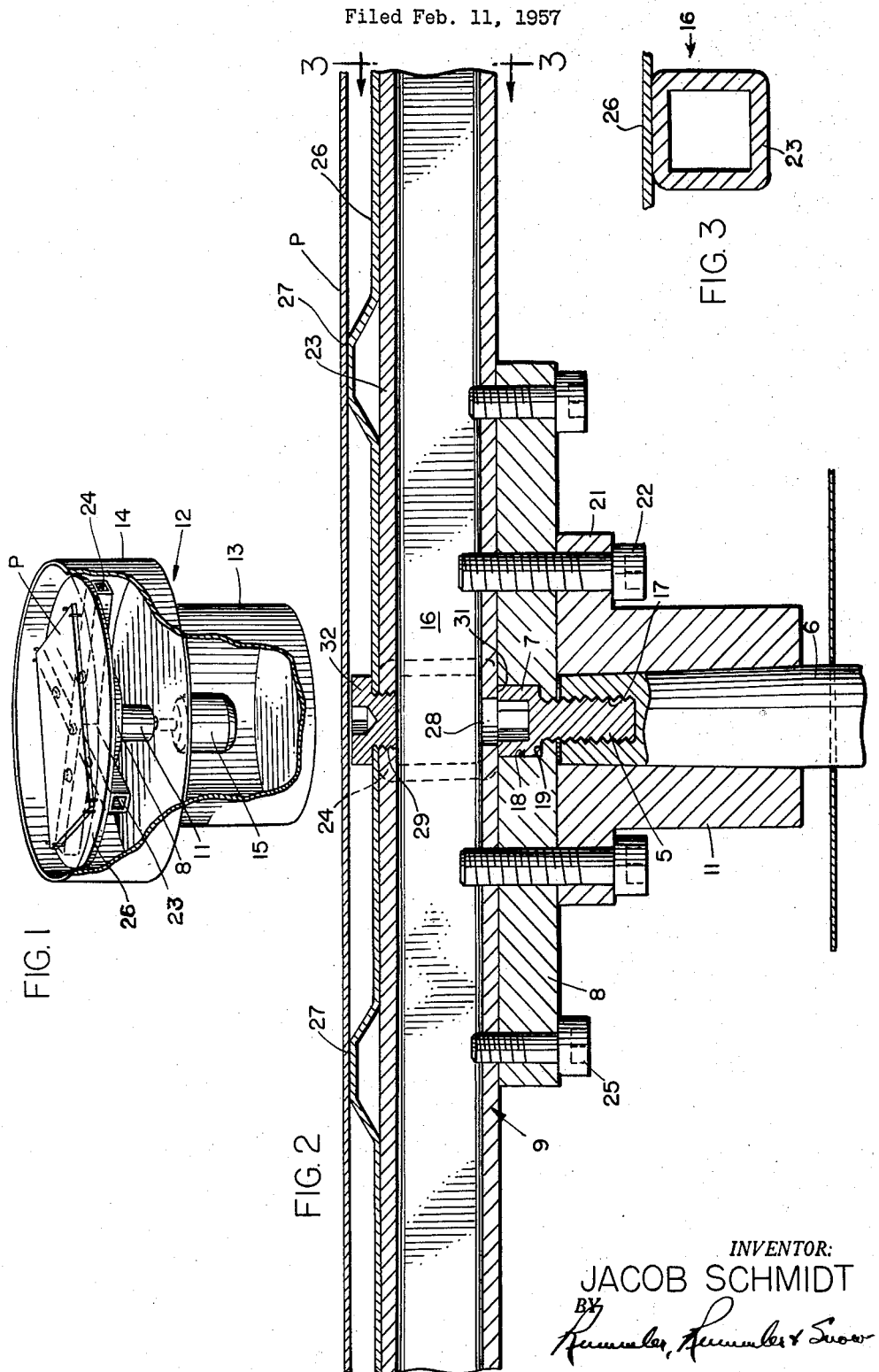
INVENTOR:
JACOB SCHMIDT
BY
Rummler, Rummler & Snow
ATT'YS

2,876,573

TAPERED-SHAFT AND HUB-ELEMENT LOCKING AND RELEASING MEANS

Jacob H. Schmidt, Chicago, Ill.

Application February 11, 1957, Serial No. 639,557

4 Claims. (Cl. 41—9)

This invention relates to double-acting screw means for locking a tapered shaft and hub element in and releasing them from operative relationship, especially adapted for use in engravers' plate whirlers.

There are many instances in machinery where a tapered shaft has to be drawn up firmly into a hub element to maintain the shaft and hub element in effective rotative relationship. When such a shaft and hub element connection has to be disassembled it often presents quite a problem in securing a reverse axial movement to effect their release from such operative relationship. This is especially true when the tapered shaft and hub element assembly is a part of a machine that has to be frequently disassembled for repair or cleaning. One such machine is an engravers' plate whirler. Since acids are involved in the use of a machine of that kind, it frequently has to be taken apart to permit a thorough cleaning of all portions of the machine. Because of the very compact construction of such a machine, users of those heretofore available have found it extremely difficult to apply sufficient force axially of the shaft and hub element to separate them. For that reason cleaning of the machine has not been effected as often as it should be done.

The main objects of this invention are to provide an improved screw means for effecting the opposite axial relative shifting of a tapered shaft and hub element to lock them in and release them from a requisite operative relationship; and to provide an improved economically-producible and easy-operable screw means of this kind espectially adapted for use with engravers' plate whirling machines.

In the adaptation shown in the accompanying drawings:

Figure 1 is a miniature, perspective of an engravers' whirling machine, the housing being broken away to permit a clearer illustration of the internal parts of the machine;

Fig. 2 is an enlarged, fragmentary, cross-sectional view, through the center of the machine shown in Fig. 1, showing an improved form of taper-shaft and hub-element locking and releasing screw means, constructed in accordance with this invention; and Fig. 3 is a detail view taken on the plane of the line 3—3 of Fig. 2.

The essential concept of this invention involves a screw means so axially interposed between a tapered shaft and hub element that the turning of the screw effects relative axial movement of the shaft and hub element to either lock them in or release them from effective operative relationship according to the direction that the screw is turned.

Such a screw means, herein termed a double-acting screw means, embodying the foregoing concept comprises a conventional cap screw 5 threaded into the end of a tapered shaft 6 and having the head 7 of the screw 5 interposed between members 8 and 9 anchored to the hub element 11, and against which members the screw exerts opposite pressures for locking the shaft 6 and hub element 11 in or releasing them from their effective operative relationship.

Such a tapered shaft-hub-element locking-and-release screw-means herein is shown and described as applied to an engravers' plate-whirling machine, for use with which such a screw means has a special utility.

The hereinshown engravers' plate-whirling machine comprises a cylindrical housing 12 formed with lower and upper parts 13 and 14 respectively enclosing a motor 15 and a plate-supporting frame 16 composed of the members 8, 9 and 26. The housing 12 is a sheet-metal formation, access to all the interior of which is had through the open end of the upper part 14. When the machine is in use this open end is closed by a suitable cover (not here shown).

The motor 15 is sealed in the lower housing part 13 with its shaft 6 extending into the upper housing part 14. The tapered upper end of the shaft 6 is embraced in the hub element 11 and is formed with a threaded bore 17 extending inwardly from its upper end to receive the cap screw 5.

The cap screw 5, preferably is of the Allen type which has a hexagonal-shape recess in the head 7. Of course other types of cap screw, such as the Phillip or even the conventional Kerf screw, could be used.

The member 8, of the plate-supporting frame, is in the form of a disk having a dual-diameter or counterbored recess 18 axially alined with the shaft bore 17. This recess 18 forms a shoulder 19 against which the under rim of the head 7 of the cap screw 5 seats when the screw is turned clockwise. Pressure is thereupon exerted to effect the relative axial shifting of the shaft 6 and the hub element 11 to drive and lock them in operative relationship. The member 8 is secured to flanges 21, of the hub element 11, by machine bolts 22.

The member 9, of the plate-supporting frame 16, is composed of a pair of intersecting cross arms 23 and 24 and is secured to the disk member 8 by machine bolts 25 with the intersection of the cross arms 23 and 24 alined axially with the shaft 6. These cross arms 23 and 24 here are shown to be rectangular tubing which mount a plate rest 26. The plate rest 26 is in the form of a sheet metal disk and has a plurality of embossments 27, formed in one face thereof, on which embossments a plate P rests in spaced relation with the main surface of the plate rest during the whirling operation.

At the intersection of the cross arms 23 and 24 apertures 28 and 29 are formed in axial alinement with the shaft 6. The lower aperture 28 is of less diameter than the diameter of the head 7 of the cap screw 5. There is thus provided a shoulder 31 conta₈table by the top of the screw head 7 so that by turning the screw 5 counterclockwise it exerts a pressure such as will effect a relative axial shifting of the shaft 6 and the hub element 11 to draw them apart and release them from their operative relationship. The upper aperture 29 seats a plug 32 for sealing off the interior of the cross arms 23 and 24.

Although not shown in detail herein, suitable attachments are provided adjacent the outer ends of the cross arms 23 and 24, which engage a plate P adjacent its corners to center and retain it on the supporting frame 16 during the whirling operation. Such attachments may be pins or pegs selectively positioned in suitable apertures arranged in rows paralleling the center lines of the arms 23 and 24, as is a common practice in this art.

The acids or other fluids used in the engraving process, during the plate whirling operation, are thrown centrifugally outward onto the inner face of the rim of the upper part 14 of the housing 12. Some of the fluid adheres to the face of this rim and the excess collects on the bottom of the part 14 from which it may be drained by any suitable means. Accordingly, engravers' whirling machines require frequent and thorough cleaning. This can be done effectively by removing only the plate supporting frame 16 and its attached hub element 11 from the shaft 6.

In whirling machines heretofore available, it has been an arduous and awkward task to reach into the machine and apply sufficient force to effect the relative axial shifting of the shaft 6 and the hub element 11 to obtain their release from their normal operative relationship. With this improved screw means that has now become a simple and expedient operation.

Upon removing the sealing plug 32, a conventional Allen screw-wrench is inserted into the head 7 of the cap screw 5 and force readily is applied to turn the screw outwardly from the threaded bore 17. The resulting pressure of the screw head 7 against the shoulder 31 exerts the necessary force to effect the relative axial movement of the shaft 6 and hub element 11 to release them from their normal operative relationship.

The plate supporting frame 16, by the removal of the machine bolts 22 and 25, may readily be completely disassembled and all parts thoroughly cleaned whenever that is desired.

After the cleaning and reassembly of the plate supporting frame 16, the hub element 11 is set on the end of the shaft 6 and the cap screw 5 started into the threaded bore 17. Turning the screw 5 presses the lower rim of the head 7 against the shoulder 19 and eventually pulls the tapered end of the shaft 6 and the tapered bore of the hub element 11 into firm contact to restore the shaft and hub element to their operative relationship.

Although but one specific embodiment of this invention has been herein shown and described it will be understood that details of the construction shown may be altered or omitted without departing from the spirit of this invention as defined by the following claims.

I claim:

1. An axial telescoping tapered shaft and embracing hub element, a plate anchored to the hub element in opposition to the end of the shaft and having an opening concentric with the shaft, a cap screw having a head at one end and a shank threaded into the end of the shaft through the opening in said plate, the plate opening being counterbored to receive the screw head and provide a shoulder against which the turning of the screw in one direction exerts a pressure to effect a relative axial shifting of the shaft and hub element to draw them into telescoped operative driving relationship, and a member superimposed on the first plate and anchored to the hub element, the said member having an aperture formed therein in axial alinement with the plate opening, the said aperture being of a diameter less than that of the screw head and thereby forming an overhanging shoulder against which the turning of the screw in the other direction exerts a pressure to effect a relative axial shifting of the shaft and hub element to release them from their operative relationship.

2. An engravers' plate-whirling machine comprising, a housing, a motor-driven shaft journaled on the bottom wall of the housing and having a free end extending vertically thereinto, the free end of the shaft having a tapered portion and having a screw thread extending axially inward from its said end, a plate-holder-supporting hub-element mounted on said free end of said shaft, the hub-element being bored to embracively fit the tapered portion of the shaft, a plate anchored to the hub element in opposition to the end of the shaft, a clamp means threaded on the free end of said shaft and having a head portion provided with opposite axially facing bearing areas, the plate being recessed to receive the said clamp means and provide a shoulder against which the turning of the clamp means in one direction on said screw thread exerts a pressure to effect a relative axial shifting of the shaft and hub element to draw them into operative driving relationship, and a member superimposed on the first plate and anchored to the hub element, the member having an aperture formed therein in axial alinement with the plate recess, the aperture being of a diameter less than that of the clamp means and thereby forming an overhanging shoulder against which the turning of the clamp means in the opposite direction exerts a pressure to effect a relative axial shifting of the shaft and hub element to release them from their operative relationship.

3. An engravers' plate-whirling machine comprising, a housing, a motor-driven shaft journaled on the bottom of the housing and having a free end extending vertically thereinto, the free end of the shaft being tapered and having an internally threaded passage extending axially inward from the tapered end, a plate-holder-supporting hub element mounted on the free end of said shaft within said housing, the hub element being bored to embracively fit the tapered end of the shaft, a plate anchored to the hub element in opposition to the end of the shaft and having a central opening alined with said threaded passage, a headed screw threaded into said passage through said opening, the plate opening being counterbored to receive the screw head and provide a shoulder for the screw head against which the turning of the screw in one direction exerts a pressure to effect a relative axial shifting of the shaft and hub element to draw them into operative relationship, and a pair of transversely-disposed rectangularly-tubular work-supporting cross-arms lying in a common plane and anchored to the plate with the intersection of the arms axially alined with the shaft, the cross-arms having an aperture formed at their intersection of less diameter than the screw head and thereby forming an outer shoulder against which the turning of the screw in the opposite direction exerts a pressure from the screw head to effect a relative axial shifting of the shaft and hub element to release them from their operative relationship.

4. An engravers' plate-whirling machine comprising, a housing, a motor-driven shaft journaled on the bottom of the housing and having a free end extending vertically thereinto, the free end of the shaft being tapered and having an internally threaded passage extending axially inward from the tapered end, a plate-holder-supporting hub element mounted on the free end of the shaft within said housing, the hub element being bored to embracively fit the tapered end of the shaft, a plate anchored to the hub element in opposition to the end of the shaft and having a central opening alined with said threaded passage, a headed screw threaded into said passage through said opening, the plate opening being counterbored to receive the screw head and provide a shoulder for the screw head against which the turning of the screw in one direction exerts a pressure to effect a relative axial shifting of the shaft and hub element to draw them into operative relationship, and a pair of transversely-disposed rectangularly-tubular work-supporting cross-arms anchored to the plate with the intersection of the arms axially alined with the shaft above the screw head, the cross-arms having a pair of axially-spaced and aligned apertures formed at the intersection of the cross arms, the lower aperture being of less diameter than the diameter of the screw head and thereby forming a shoulder against which the turning of the screw in the opposite direction exerts a pressure to effect a relative axial shifting of the shaft and hub element to release them from their operative relationship, and a threaded plug in the upper frame aperture to seal off the interior of the cross arms.

References Cited in the file of this patent

UNITED STATES PATENTS

| | | |
|---|---|---|
| 2,489,376 | Harper | Nov. 29, 1949 |
| 2,509,848 | Ulasich | May 30, 1950 |
| 2,721,063 | Bowman | Oct. 18, 1955 |
| 2,778,209 | Wilson | Jan. 22, 1957 |